(12) United States Patent
Vijay et al.

(10) Patent No.: US 11,370,286 B2
(45) Date of Patent: Jun. 28, 2022

(54) SYSTEM FOR VEHICLE NOISE AND VIBRATION REDUCTION

(71) Applicant: KARMA AUTOMOTIVE LLC, Irvine, CA (US)

(72) Inventors: Shashank Vijay, Foothill Ranch, CA (US); Melody Vo, Tustin, CA (US); James Knittel, Lake Forest, CA (US)

(73) Assignee: Karma Automotive LLC, Irvine, CA (US)

( * ) Notice: Subject to any disclaimer, the term of this patent is extended or adjusted under 35 U.S.C. 154(b) by 152 days.

(21) Appl. No.: 16/827,338

(22) Filed: Mar. 23, 2020

(65) Prior Publication Data

US 2021/0291634 A1 Sep. 23, 2021

(51) Int. Cl.
*B60K 1/00* (2006.01)
*B60K 17/08* (2006.01)

(52) U.S. Cl.
CPC .............. *B60K 1/00* (2013.01); *B60K 17/08* (2013.01); *B60L 2270/142* (2013.01); *B60L 2270/145* (2013.01)

(58) Field of Classification Search
CPC ..... B60K 1/00; B60K 17/08; B60L 2070/142; B60L 2070/145
See application file for complete search history.

(56) References Cited

U.S. PATENT DOCUMENTS

| 5,562,178 A * | 10/1996 | Worden | B60K 1/00 180/291 |
| 2008/0261740 A1* | 10/2008 | Shimizu | B60L 50/61 475/5 |
| 2011/0232287 A1* | 9/2011 | Wust | B60K 6/442 60/718 |

* cited by examiner

*Primary Examiner* — Bryan A Evans
(74) *Attorney, Agent, or Firm* — Honigman LLP

(57) ABSTRACT

A drive module for an electric vehicle having noise, vibration, and harshness counter measures. The drive module includes multiple covers and mass dampeners in order to detune vibration and noise from the cabin of the vehicle.

17 Claims, 9 Drawing Sheets

SYSTEM FOR VEHICLE NOISE AND VIBRATION REDUCTION

The present disclosure relates to a power train of an electric vehicle. In particular, a rear drive module (RDM) of a vehicle having noise, vibration and harshness (NVH) countermeasures.

A vehicle may include a rear drive module that comprises one or more electric tractions motors configured to drive the wheels of the vehicle. An inverter system may also be provided in the RDM in order to convert D/C power from the main high voltage propulsive battery to A/C power in order to power the electric traction motors. The RDM may also comprise a transmission or a gearbox for changing the drive ratio between the motor and the vehicle wheels. Noise emitted from the gearbox and/or peak whine emitted by the inverter/traction motors and/or vibration between components of the vehicle/RDM may reduce passenger comfort and overall satisfaction of the passengers.

This application discloses a passive noise reduction system configured to reduce the amount of noise emitted from the RDM by providing acoustic dampening and mechanical dampening to reduce vibration.

BRIEF DESCRIPTION OF THE DRAWINGS

The features, aspects, and advantages of the present disclosure will become apparent from the following description, and the accompanying exemplary embodiments shown in the drawings, which are briefly described below.

DETAILED DESCRIPTION

According to one embodiment of the disclosure, a drive module is provided for a vehicle. The drive module includes at least one electric motor configured to drive wheels of the vehicle, a gearbox mechanically attached to the at least one electric motor. The gearbox is configured to receive output from the at least one electric motor. An inverter is provided to provide power for the at least one electric motor from a battery of the vehicle. The drive module includes an acoustic wrap configured to dampen noise emitted from the drive module, and a mass dampener attached to a motor of the at least one electric motor configured to reduce vibration of the drive module.

According to another exemplary embodiment, a vehicle includes a main propulsive battery pack. The vehicle further includes a drive module. The drive module includes at least one electric motor configured to drive wheels of the vehicle, a gearbox mechanically attached to the at least one electric motor, wherein the gearbox is configured to receive output from the at least one electric motor, an inverter configured to provide power for the at least one electric motor from a battery of the vehicle, an acoustic wrap configured to dampen noise emitted from the drive module, and a mass dampener attached to a motor of the at least one electric motor configured to reduce vibration of the drive module.

According to another exemplary embodiment, a rear drive module for a drive train of an electric vehicle is provided. The rear drive module includes a pair of electric motors each configured to drive a corresponding rear wheel of the vehicle, a gearbox mechanically attached to the at least one electric motor. Wherein the gearbox is configured to receive output from the pair of electric motors, a pair of inverters corresponding to each electric motor configured to convert power from the battery of the vehicle to corresponding motor of the pair of electric motors. A first and second acoustic wrap attached to and covering a corresponding electric motor of the pair of electric motors. A pair of mass dampeners attached to a corresponding electric motor of the pair of electric motors, wherein the mass dampeners configured to reduce vibration of the drive module. Wherein the pair of mass dampeners is attached to corresponding mounting points of the vehicle frame.

Figure 1A:
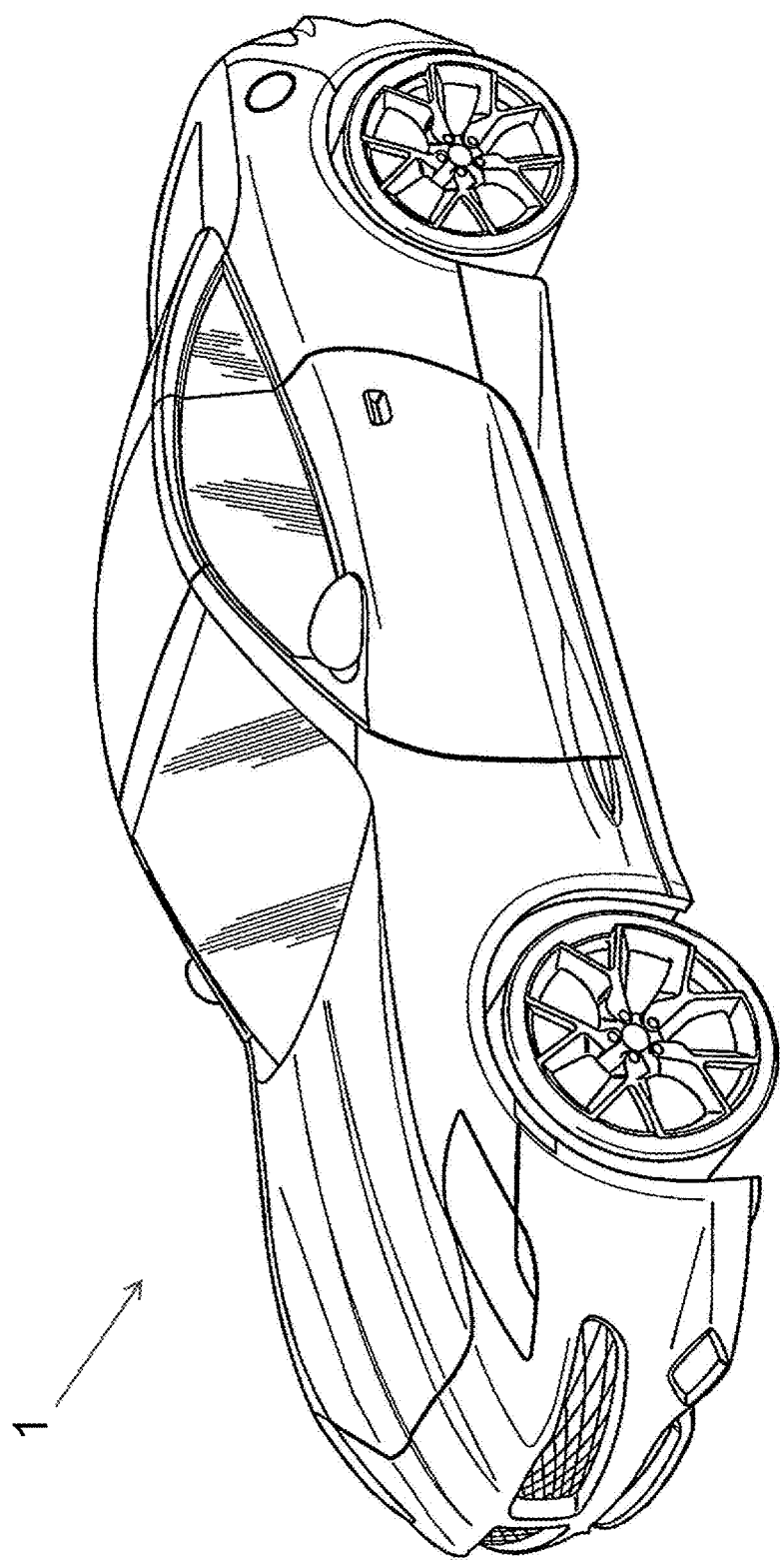
FIG. 1A is an electric vehicle having a rear drive module.

FIG. 1A illustrates a vehicle 1 having a high voltage propulsive battery connected to a rear drive module (RDM) (not shown; inside the vehicle 1) configured to drive the rear wheels of the vehicle. Although a rear drive module is shown and described for exemplary purposes, the scope of the NVH reduction system disclosed herein is not limited to rear drive modules. The disclosed system may be employed with drive modules for one or more vehicle wheels, regardless of location of the drive module or the wheel(s) being driven.

Figure 1B:
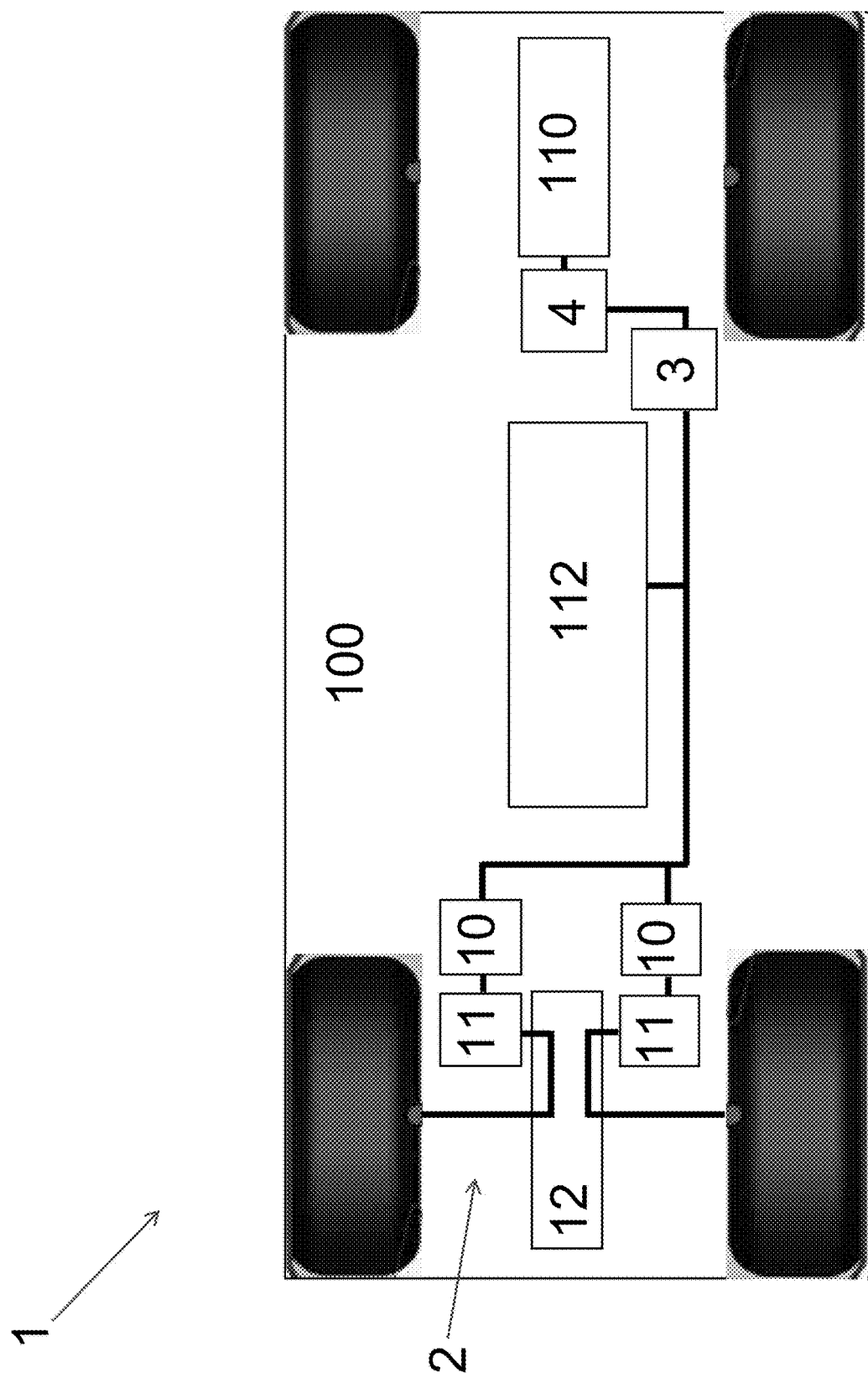
FIG. 1B is a drive train schematic of the vehicle shown in FIG. 1A.

FIG. 1B shows an electric vehicle 1 with the drivetrain 100, the exemplary vehicle includes an internal combustion engine 110, a generator 4, and electric traction motors 11. The internal combustion engine 110 drives the generator 4 to produce electrical power for a battery 112 and the motors 11. A generator inverter 3 connected to the generator 2 may also be provided. A gearbox 12 is configured to provide the required drive ratio for the vehicle. Power to the motors 11 is communicated via inverters 10, which transforms DC power provided to the AC power required by the motors 11.

Figure 2:
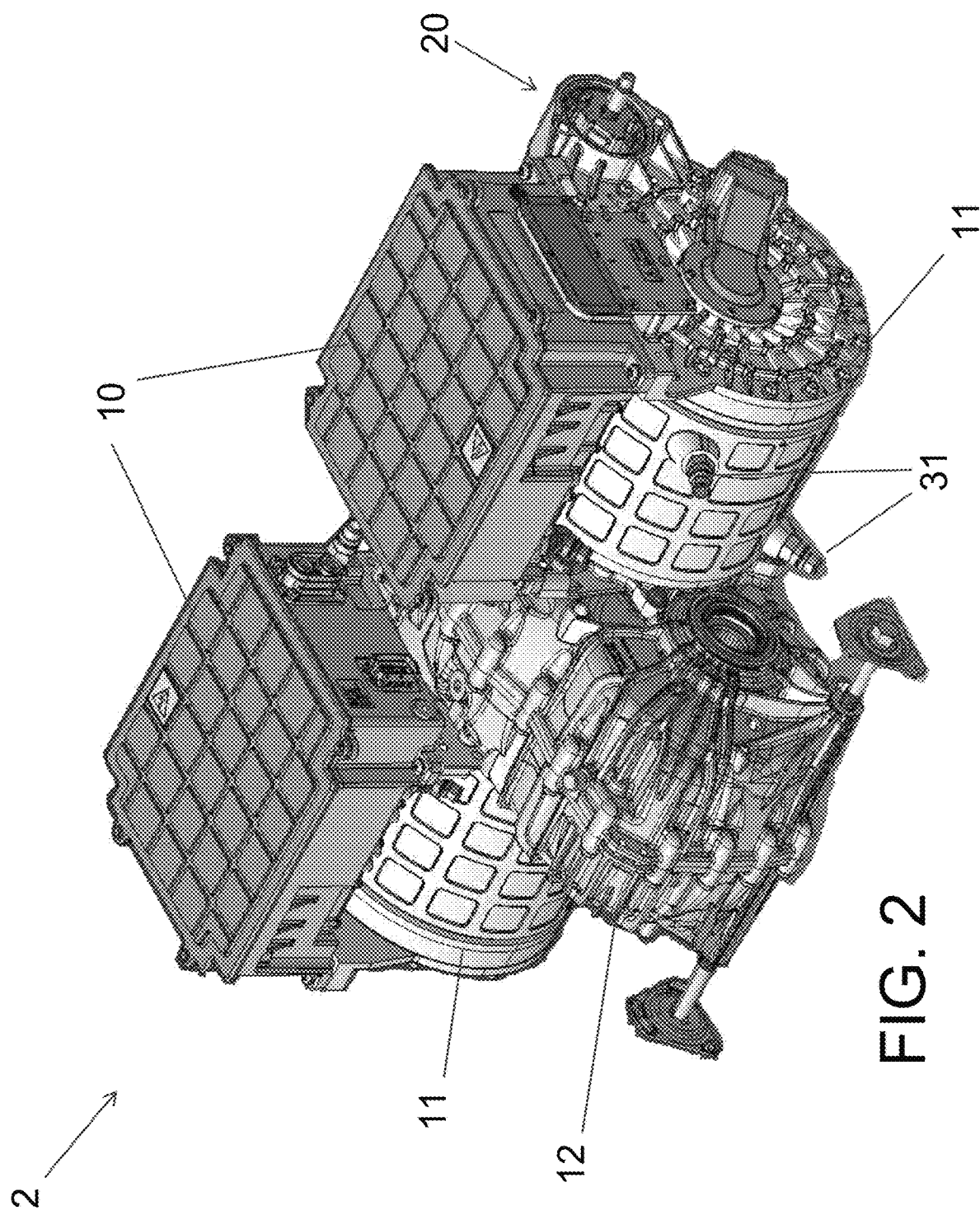
FIG. 2 is a front side view of an exemplary rear drive module.
Figure 3:
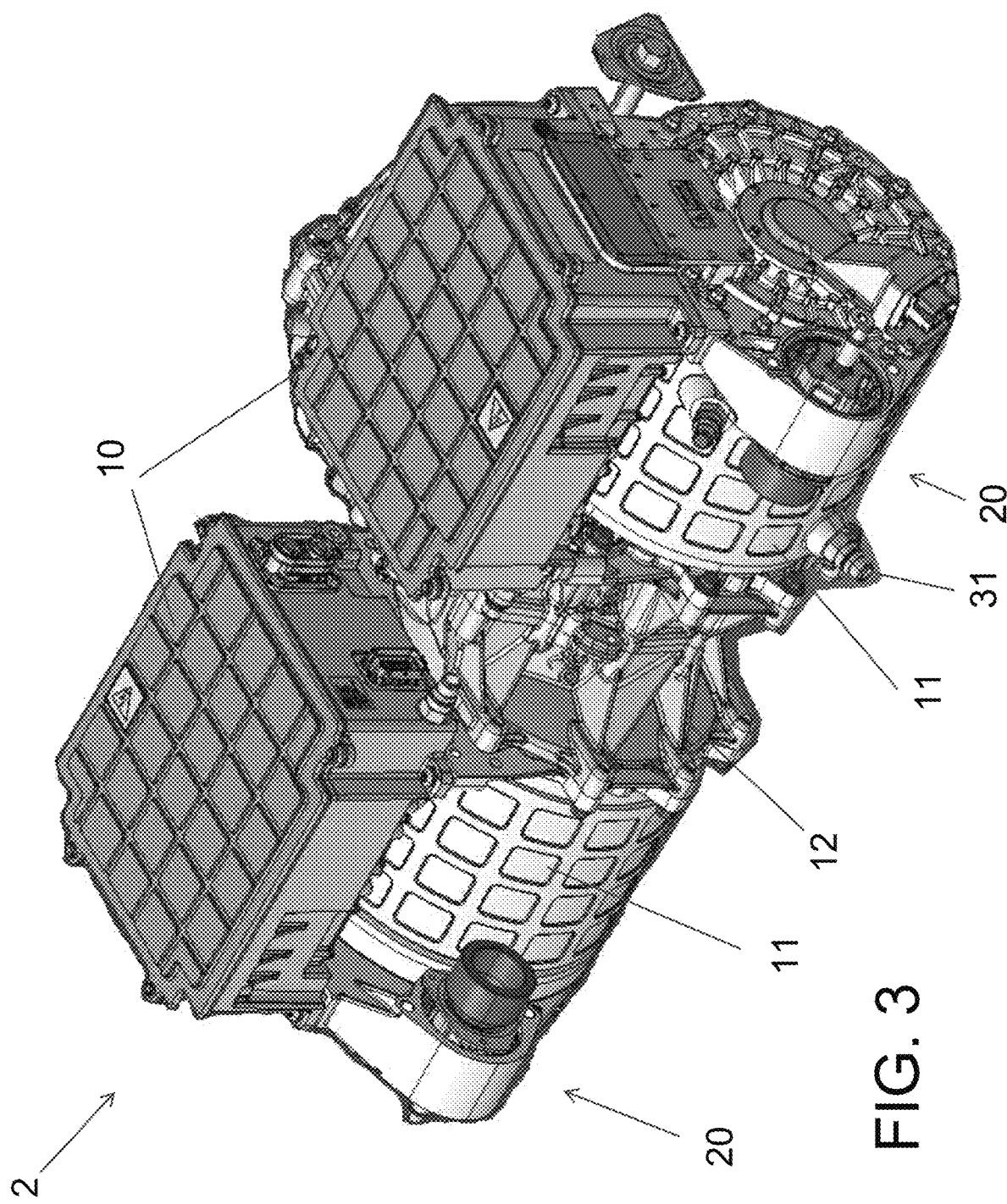
FIG. 3 is a back side view of the rear drive module of FIG. 2.

FIGS. 2 and 3 show an exemplary RDM 2 having one or more electric traction motors 11. Inverters 10 are configured to convert D/C power from the main high voltage propulsive battery (not shown) to A/C power in order to power the traction motors 11. The traction motors are connected to a transmission/gearbox 12 for changing the drive ratio between the motor and the vehicle wheels. Dampener assemblies 20 may be inserted into each frame of the electric motors 11. The dampener assembly is configured to act as a mass dampener and reduce the vibration of the RDM 2. Each inverter 10 may be attached to corresponding electric motor 11, and each electric motor 11 is attached to the gearbox 12. Thus, the components of RDM 2 are mechanically attached to at least the electric motor 11. The mechanism of the mass dampener assemblies 20 is explained further below.

Figure 4:
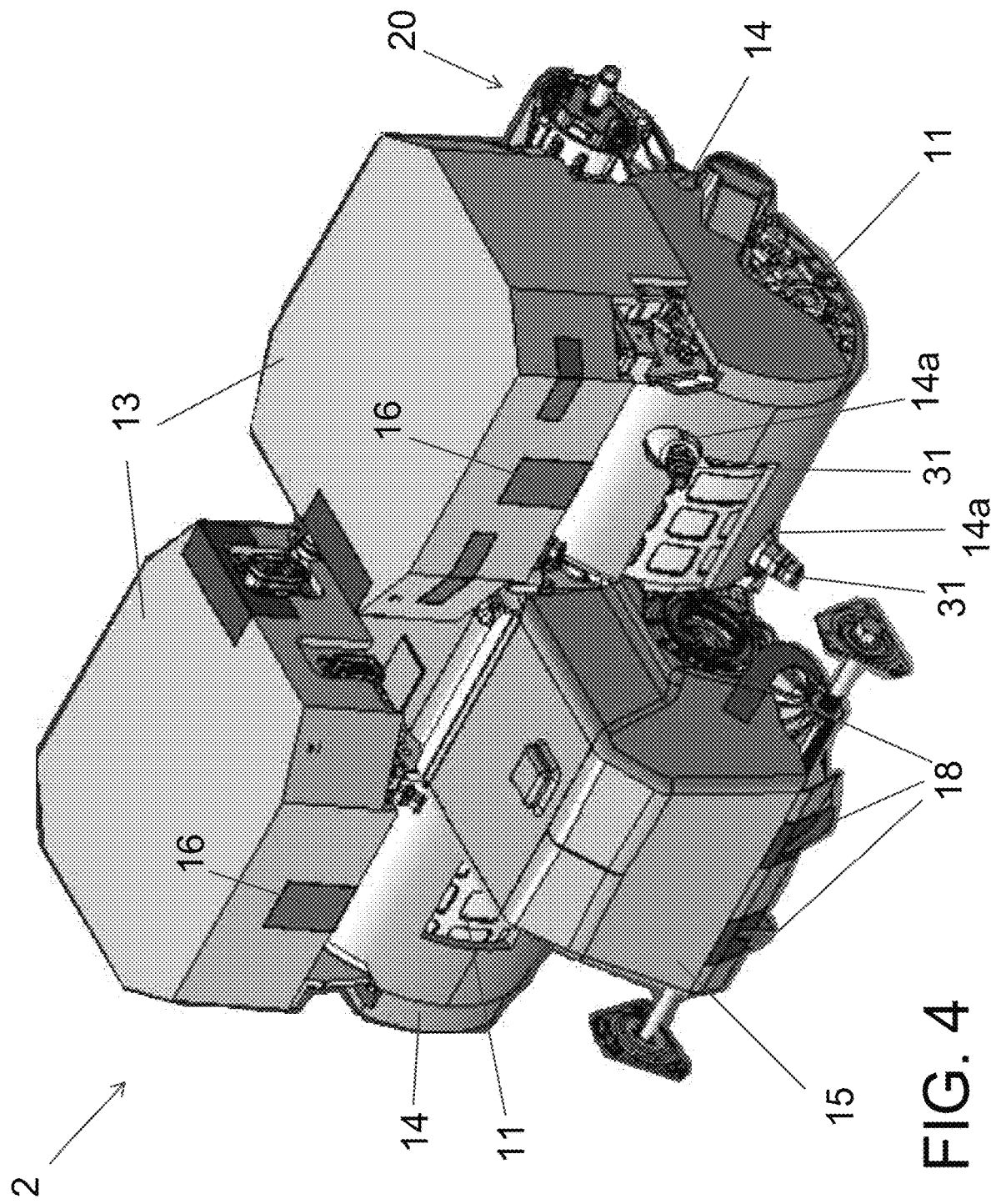
FIG. 4 is a view of the rear drive module of FIG. 2 including covers.
Figure 5:
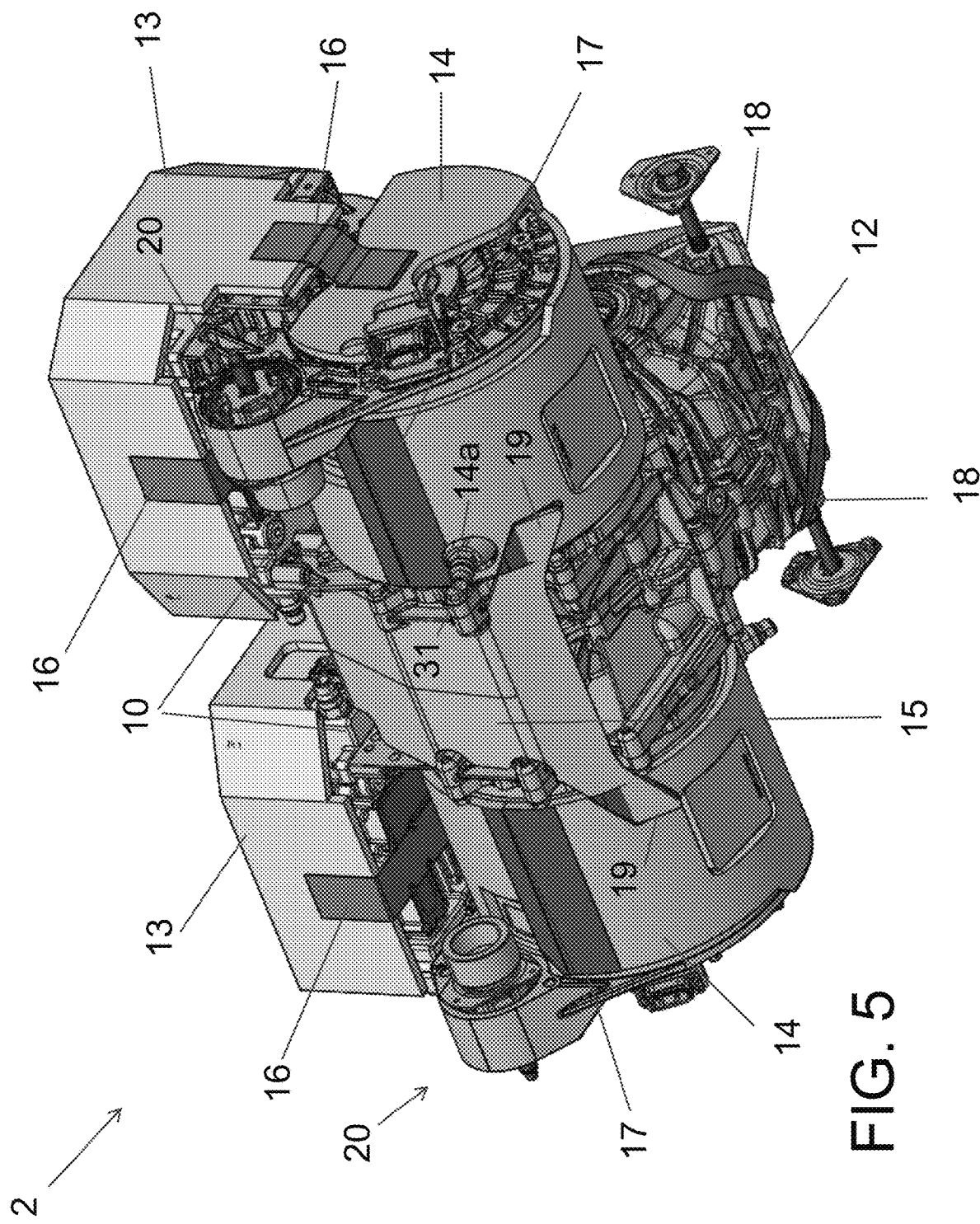
FIG. 5 is a bottom view of the covered rear drive module of FIG. 4.

FIGS. 4 and 5 shows the RDM 2 having acoustic wraps 13, 14, and 15. Each corresponding acoustic wrap 13, 14, and 15 is configured to conform to the shape of the corresponding component covered by each wrap 13, 14, and 15. For example, the acoustic wrap 13 conforms to the shape of inverters 10, the acoustic wrap 14 confirms to the shape of the electric motors 11, and the acoustic wrap 15 conforms to the shape of the transmission/gearbox 12. Each acoustic wrap includes attachments 16/17/18/19 configured to hold the wrap in place onto the corresponding covered components. Attachment 16 is configured to be attached or fastened onto the inverter cover 13 and structurally support the inverter cover 13. Attachment 16 may also be attached to a portion of the electrical motor 11. The attachment 16 may also extend from side to side as shown in FIG. 4 and FIG. 5, where attachment 16 extends from one side of the inverter cover 13 shown in FIG. 5 to the opposite side of the inverter cover shown in FIG. 4. Attachments 19 may include tabs that prevent the gearbox acoustic wrap 15 from being detached. The attachments 18 may include a band extending from a side of the gearbox acoustic wrap 15 towards the bottom of the gearbox wrap 15 and ending at the front of gearbox wrap as shown in FIG. 4. The attachments 17 of the acoustic wrap 14 of the electric motors 11 may also include Velcro (e.g. hook and loop fastener) configured to hold and close the acoustic wrap 14 around the electric motors 11.

Figure 6:
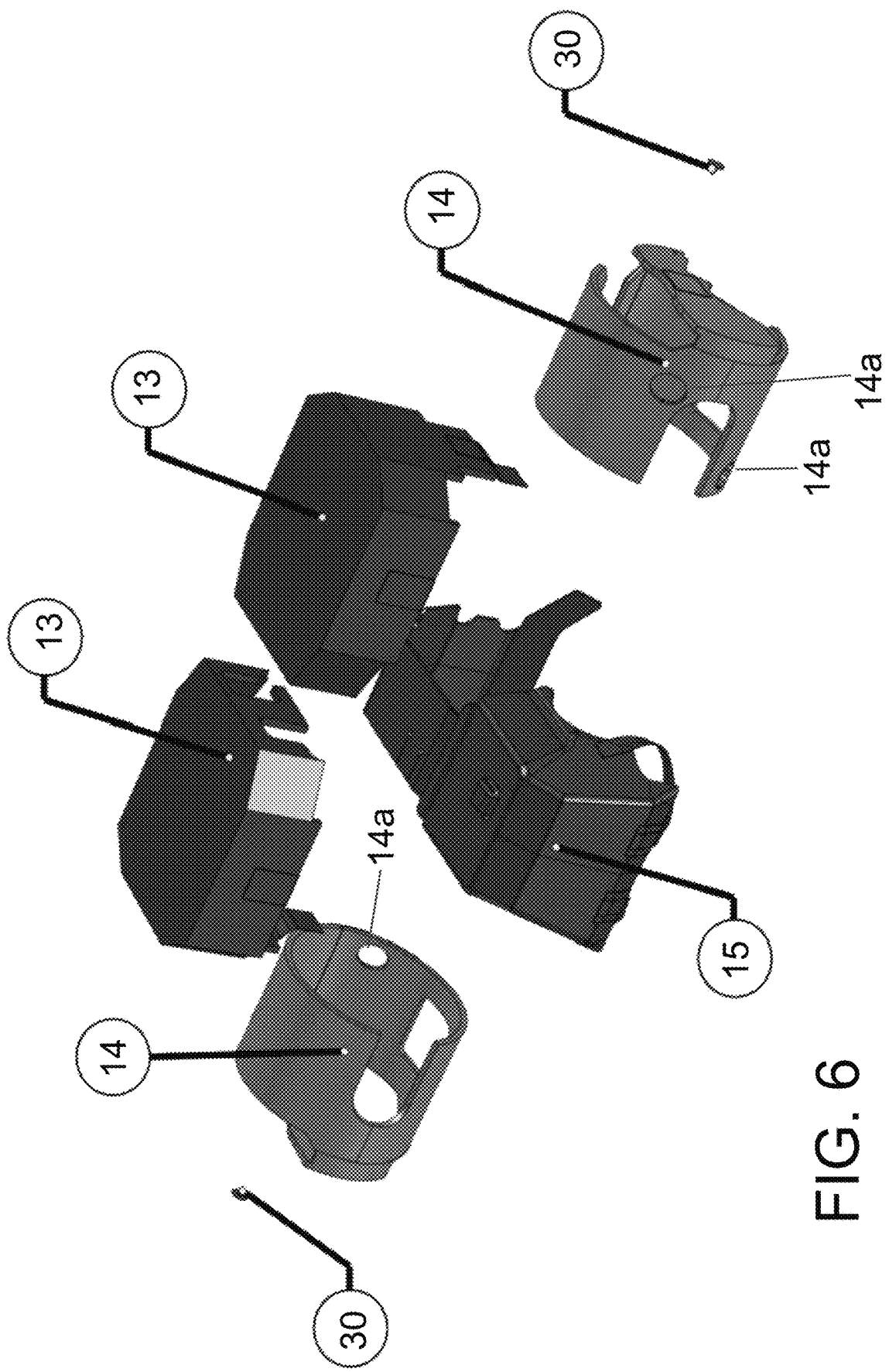
FIG. 6 is perspective view of the covers shown in FIGS. 4 and 5.

FIG. 6 shows an isolated view of each wrap 13/14/15. A retaining fastener 30 may be provided to hold the cover 14 to the corresponding motors 11. Retaining fastener 30 may be a ratchet type fastener (e.g. Christmas tree clip). The retaining fasteners 30 are configured to be inserted into the frame 11a of the corresponding motor 11. The attachments 16-19 may be made integral to the corresponding attached acoustic cover. The attachments 16, 18, and 19 may be attached to the corresponding elements via Velcro (i.e. hook and loop fasteners) similar to attachment 17. For example, tabs 19 of wrap 15 may be attached onto wrap 14 via Velcro, and endpoints of attachment 16 may include Velcro attachment to its corresponding structure at the end of the attachments. Each acoustic wrap 13/14/15 may include two or more layers of materials and may include a heavy layer barrier in addition to an lightweight acoustic de-coupler and an anti-abrasive scrim on inner and outer surfaces of the acoustic wraps 13/14/15 to improve handling of the warps, ward of external contaminants, and improve heat resistance. Materials are chosen for acoustic performance while also managing temperature requirements and environmental constraints. The wraps 13/14/15 encloses all necessary surfaces while leaving adequate ventilation for cooling and clearance to moving/rotating parts. This system reduces noise coming from the RDM 2, specifically high frequency noise (>500 hz). The shape of the wrap 13/14/15 may also accommodate for additional systems of the RDM 2. For example, the wrap 14 of the electric motor may accommodate for cooling ports 31 shown in FIGS. 2-5 via cutout 14a. Cutout 14a allows the warp 14 to accommodate for cooling ports 31 while also allowing the cooling ports 31 to act as a lock to prevent the wrap 14 from moving or sliding.

Figure 7:
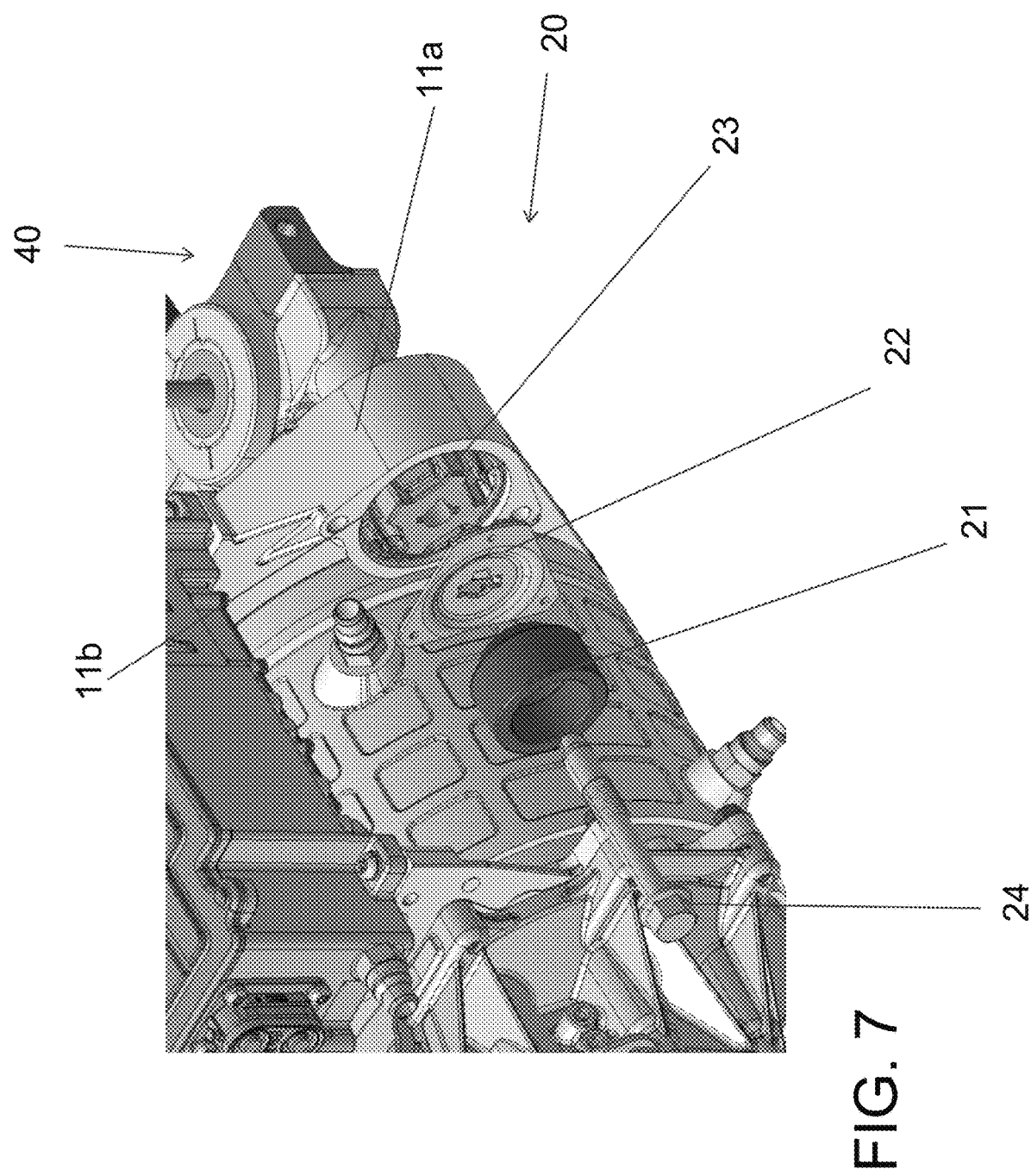
FIG. 7 is a close up and exploded view of the mass dampener system of the rear drive module shown in FIG. 2.
Figure 8:
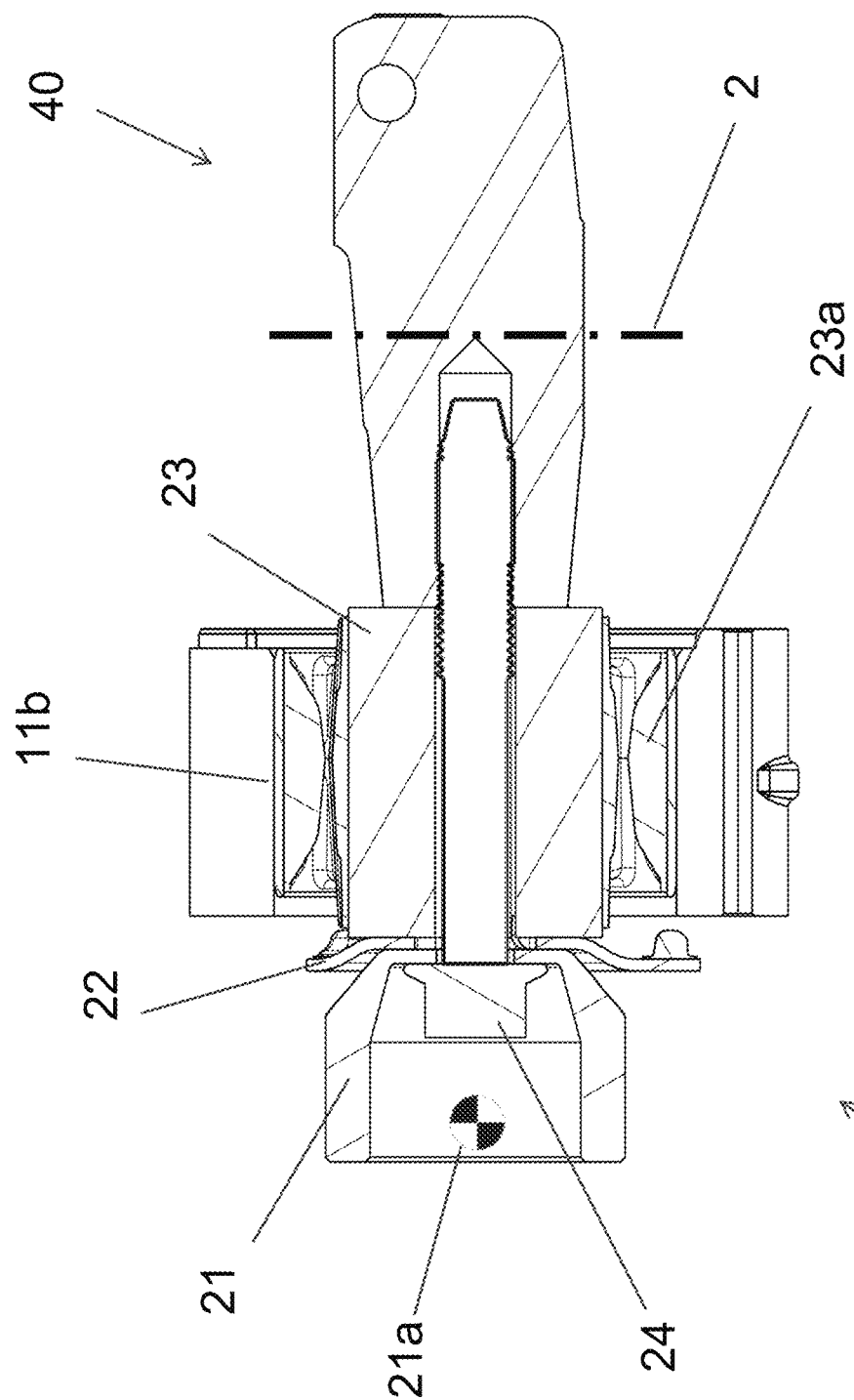
FIG. 8 is a sectional view of the mass dampener system.

FIG. 7 shows a close up and exploded view of the mass dampener assembly 20. The mass dampener assembly 20 may be inserted into a frame 11a of the electric traction motor 11. The dampener assembly includes an insert 23, a plate 22, a bolt 24, and a detuning mass 21. Each electric motor 11 is configured to be attached to a mounting structure 40 of the vehicle 1. The mounting structure 40 may be an attachment point of the vehicle frame of the vehicle 1. The insert 23 is configured to be located in an opening 11b of the electric motor frame 11a. The plate 22 configured to be placed between the insert 23 and the detuning mass 21. The head of the bolt 24 is configured to sit inside an opening of the detuning mass 21. The plate 22 is configured to support the detuning mass 21. As shown in FIG. 8, this configuration allows the center of gravity 21a of the detuning mass 21 to sit further from the structural fulcrum 25 of the RDM 2. The structural fulcrum 25 is the pivot point of vibrational movement due to forces from the RDM 2. The mass dampener assembly 20 is configured to reduce the vibration of RDM 2 relative to the structural fulcrum. Insert 23 may be flexible and may include springs 23a in order to provide vibration detuning via the mass dampener 21. The mass dampener assembly 20 added is configured to effectively increase dynamic stiffness of rear drive module mounting structure 40, thereby minimizing structure borne noise. The detuning mass 21 is designed such that the fastener length can be minimized. The cup shape of the detuning mass 21 allows convenient installation and easy tool access. The cup design also allows the center of gravity of the mass 21a to be distant from the mount location to maximize the effectiveness of the dampening assembly 20. Insert 23 may also comprise of a rubber material configured to isolate further structural vibrations of the RDM 2 and mounting structure 40, specifically structural low frequency noise. The materials may include a composite sandwich of materials, ordered from the inner layer to outer layer, comprising of an approximately 0.05 mm thick 30 oz scrim, approximately 7 mm thick lightweight polyurethane foam, approximately 2.5 mm thick heavyweight EVA (Etholyne/Vinyl/Acetate formulation), and approximately 0.05 mm thick 40 z scrim. The lightweight layer should lay closest to the RDM 2, with the heavyweight layer nearer to the outside. Thus the 30 oz scrim lays closest to the RDM 2 while the 40 oz scrim is located the furthest. Although only one side of the RDM 2 is shown in FIG. 2, the configuration of mass dampener assembly 20 shown in FIGS. 7 and 8 is also provided on the other electric motor 11.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the read drive module as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A drive module for a vehicle comprising:
    at least one electric motor configured to drive wheels of the vehicle;
    a gearbox mechanically attached to the at least one electric motor, wherein the gearbox is configured to receive output from the at least one electric motor;
    an inverter configured to provide power for the at least one electric motor from a battery of the vehicle;
    an acoustic wrap configured to dampen noise emitted from the drive module; and
    a mass dampener attached to a motor of the at least one electric motor configured to reduce vibration of the drive module;
    wherein the acoustic wrap includes an inverter acoustic wrap, configured to be attached to and cover the inverter in order to significantly dampen noise from the inverter.

2. The drive module of claim 1, wherein the acoustic wrap further comprises an electric motor acoustic wrap, configured to be attached to and cover the one motor of at least one electric motor in order to significantly dampen noise from the one motor.

3. The drive module of claim 2, wherein the electric motor acoustic wrap includes a motor attachment configured to hold the electric motor acoustic wrap onto the electric motor and close the acoustic wrap.

4. The drive module of claim 1, wherein the inverter acoustic wrap includes a first inverter attachment configured to hold the acoustic wrap onto the inverter; and wherein the first inverter attachment is fastened onto the inverter.

5. The drive module of claim 4, wherein the inverter acoustic wrap includes a second inverter attachment configured to hold the acoustic wrap onto the inverter; and wherein the second inverter attachment is fastened onto the one motor of the at least one electric motor.

6. The drive module of claim 1, wherein the acoustic wrap further includes a gearbox acoustic wrap, configured to be attached to and cover the gearbox in order to significantly dampen noise from the gearbox.

7. The drive module of claim 6, wherein the gearbox acoustic wrap includes attachment tabs configured to hold the gearbox acoustic wrap onto the gearbox.

8. A vehicle comprising:
    a main propulsive battery;
    a drive module electrically connected to the battery comprising:
        at least one electric motor configured to drive wheels of the vehicle;
        a gearbox mechanically attached to the at least one electric motor, wherein the gearbox is configured to receive output from the at least one electric motor;
        an inverter configured to provide power for the at least one electric motor from a battery of the vehicle;
        an acoustic wrap configured to dampen noise emitted from the drive module; and
        a mass dampener attached to the at least one electric motor configured to reduce vibration of the drive module; and
        wherein the acoustic wrap includes an inverter acoustic wrap, configured to be attached to and cover the inverter in order to significantly dampen noise from the inverter.

9. The vehicle of claim 8, wherein the acoustic wrap further comprises an electric motor acoustic wrap, configured to be attached to and cover one motor of at least one electric motor in order to significantly dampen noise from the one motor.

10. The vehicle of claim 9, wherein the electric motor acoustic wrap includes a motor attachment configured to hold the electric motor acoustic wrap onto the electric motor and close the acoustic wrap.

11. The vehicle of claim 8, wherein the inverter acoustic wrap includes a first inverter attachment configured to hold the acoustic wrap onto the inverter; and wherein the first inverter attachment is fastened onto the inverter.

12. The vehicle of claim 11, wherein the inverter acoustic wrap includes a second inverter attachment configured to hold the acoustic wrap onto the inverter; and wherein the second inverter attachment is fastened onto one motor of the at least one electric motor.

13. The vehicle of claim 8, wherein the acoustic wrap further includes a gearbox acoustic wrap, configured to be attached to and cover the gearbox in order to significantly dampen noise from the gearbox.

14. The vehicle of claim 13, wherein the gearbox acoustic wrap includes attachment tabs configured to hold the gearbox acoustic wrap onto the gearbox.

15. A drive module for a vehicle comprising:
    at least one electric motor configured to drive wheels of the vehicle;
    a gearbox mechanically attached to the at least one electric motor, wherein the gearbox is configured to receive output from the at least one electric motor;
    an inverter configured to provide power for the at least one electric motor from a battery of the vehicle;
    an acoustic wrap configured to dampen noise emitted from the drive module; and
    a mass dampener attached to a motor of the at least one electric motor configured to reduce vibration of the drive module; wherein the mass dampener comprises:
        an insert located inside an opening of a frame of the one motor of the at least one motor, wherein the insert is configured to receive a bolt;
        a detuning mass directly adjacent a plate, wherein the plate abuts the insert;
        said bolt extends through the detuning mass, the plate, and the insert and is configured to be attached to a mounting point of the vehicle at the end of the bolt;
        wherein the detuning mass is configured to dampen the vibrations of the drive module.

16. A rear drive module for a drive train of an electric vehicle:
- a pair of electric motors each configured to drive a corresponding rear wheel of the vehicle;
- a gearbox mechanically attached to the pair of electric motors, wherein the gearbox is configured to receive output from the pair of electric motors;
- a pair of inverters corresponding to each electric motor configured to convert power from the battery of the vehicle to corresponding motor of the pair of electric motors;
- a first and second acoustic wrap attached to and covering a corresponding electric motor of the pair of electric motors;
- a pair of mass dampeners attached to a corresponding electric motor of the pair of electric motors, wherein the mass dampeners configured to reduce vibration of the drive module; and
- wherein the pair of mass dampeners is attached to corresponding mounting points of the vehicle frame.

17. The rear drive module of claim 16, wherein each of the mass dampeners comprises:
- an insert located inside an opening of a corresponding frame of the pair of electric motors, wherein the insert is configured to receive a bolt;
- a detuning mass directly adjacent a plate, wherein the plate abuts the insert;
- said bolt extends through the detuning mass, the plate, and the insert and is configured to be attached to a corresponding mounting point of the vehicle at the end of the bolt;
- wherein the detuning mass is configured to dampen the vibrations of the rear drive module.

* * * * *